United States Patent

[11] 3,632,319

| [72] | Inventors | George S. Hoppin;<br>Reed E. Yount; Thomas F. Berry; James F. Barker, all of Cincinnati, Ohio |
|---|---|---|
| [21] | Appl. No. | 841,093 |
| [22] | Filed | July 11, 1969 |
| [45] | Patented | Jan. 4, 1972 |
| [73] | Assignee | General Electric Company |

[54] DIFFUSION BONDING OF SUPERALLOY MEMBERS
5 Claims, 5 Drawing Figs.

[52] U.S. Cl. ............................................. 29/487, 29/494, 29/497, 29/498, 29/504
[51] Int. Cl. .............................................. B23k 31/02
[50] Field of Search .................................. 29/487, 494, 497, 498, 501, 504

[56] References Cited
UNITED STATES PATENTS

| 2,714,760 | 8/1955 | Boam et al. ............... | 29/498 X |
| 2,957,239 | 10/1960 | Pritchard et al. ........... | 29/498 X |
| 3,005,258 | 10/1961 | Songdohl, Jr. et al. ...... | 29/494 |
| 3,024,109 | 3/1962 | Hoppin et al. ............. | 29/487 X |
| 3,088,192 | 5/1963 | Turner ...................... | 29/494 X |
| 3,108,861 | 10/1963 | Cape ........................ | 29/498 X |
| 3,197,858 | 8/1965 | Feduska et al. ............ | 29/504 X |
| 3,246,981 | 4/1966 | Quaas et al. ............... | 29/504 X |
| 3,417,461 | 12/1968 | Wells et al. ................ | 29/487 |
| 3,530,568 | 9/1970 | Owczarski et al. .......... | 29/498 |

*Primary Examiner*—John F. Campbell
*Assistant Examiner*—Ronald J. Shore
*Attorneys*—Derek P. Lawrence, Lee H. Sachs, E. S. Lee, III, Frank L. Neuhauser, Oscar B. Waddell and Joseph B. Forman

ABSTRACT: An improved diffusion-bonded, age hardenable joint between superalloy members results from a method which combines the benefits of vacuum high-temperature brazing and pressure solid-state diffusion bonding through use of an age hardenable bonding powder related to the superalloy and including temperature depressants selected from B, Si, Mn, Cb, Ta and their mixtures. The method avoids the need for pressure during the diffusion bonding portion.

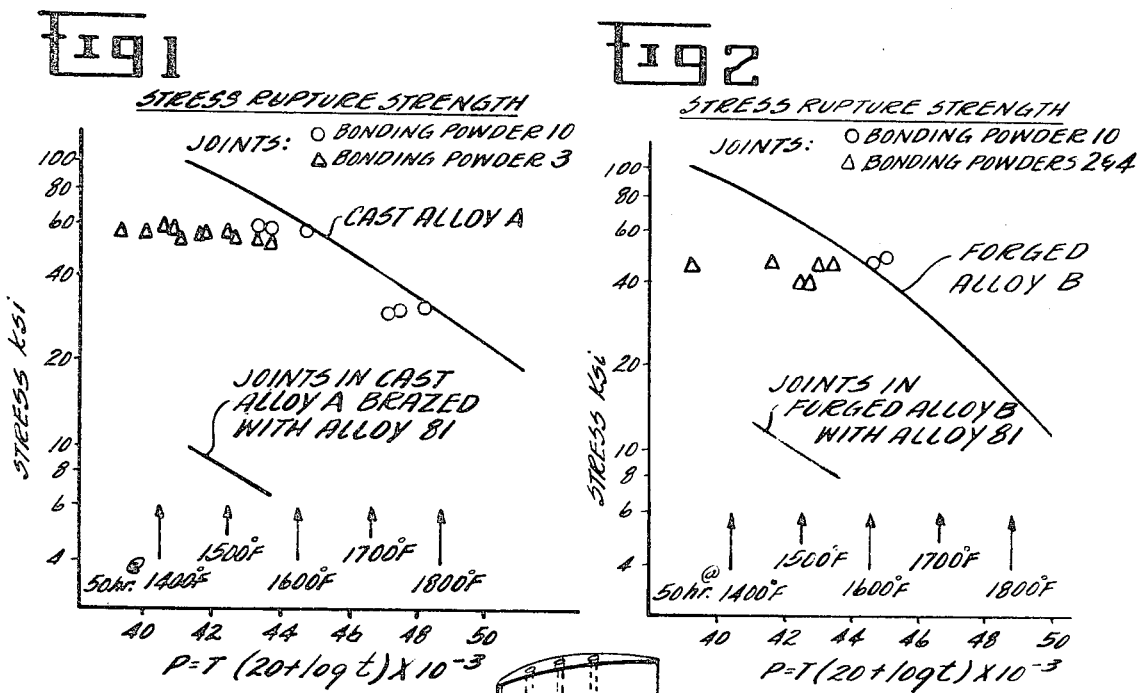
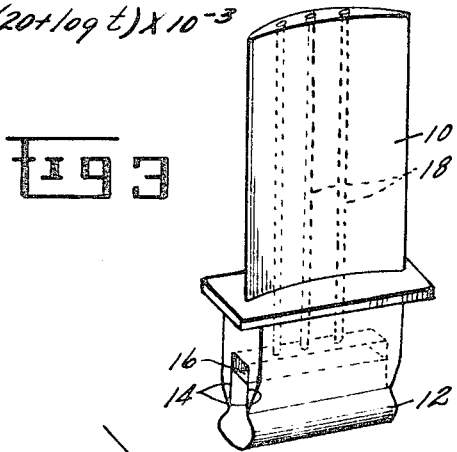
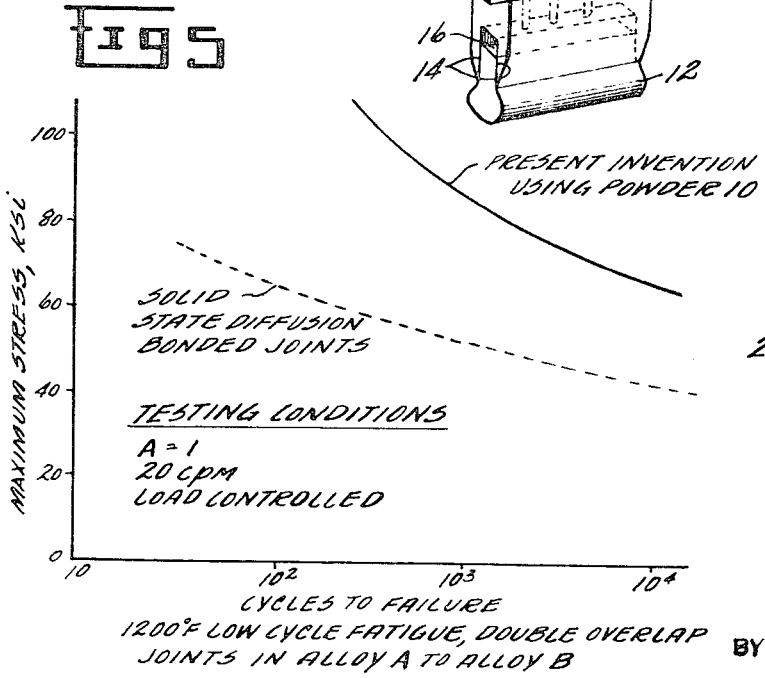
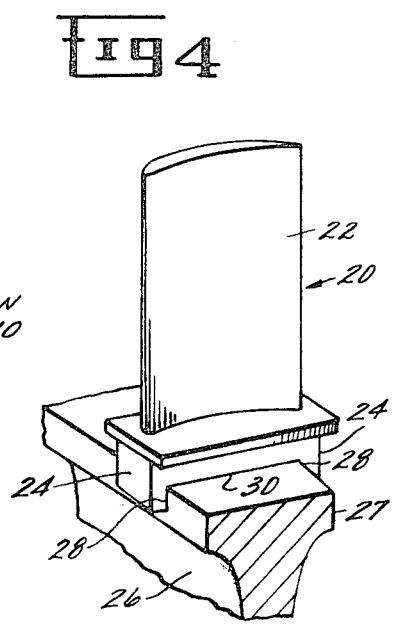
INVENTORS.
GEORGE S. HOPPIN III
REED E. YOUNT
THOMAS F. BERRY
JAMES F. BARKER
ATTORNEY

DIFFUSION BONDING OF SUPERALLOY MEMBERS

Development of known brazing alloys for superalloys such as those based on Ni, Co, or Fe generally has been based on relatively simple ternary or quaternary alloy systems relatively near or at an eutectic point. This provided relatively low melting alloys needed for brazing structural superalloys. In addition, such relatively simple systems avoided problems which had been encountered in both production of relatively reactive, complex alloy powders and in brazing with such powders in conventional furnace atmospheres. As a result, brazing alloys such as those for nickel base superalloys have been simple alloys low in strength.

Because the joint between two bonded superalloy members generally has been the weakest link in the structure, development of improved power-producing apparatus, for example turbomachinery such as jet engines, has specified a need to improve such joint strength. Conventional fusion welding has been severely limited because of cracking which may occur during welding or subsequent heat treatment.

In recent years, significant accomplishments have been reported in vacuum hot press, solid-state diffusion bonding of superalloys such as those based on nickel. Although there have been some improvements in the bonding of substantially nonfusion weldable superalloys, the process has certain inherent problems which limit its applicability to a wide range of article designs. For example, relatively high unit pressures are required at the bonding temperature. For example, minimum pressures of about 2,000 p.s.i. at 2,200° F. appear to be representative. Such a method prohibits the use of the process on relatively fragile parts. In addition, there is created at the juncture of the joined members a notch which tends to reduce strength such as high cycle fatigue strength. Surface preparation procedures required in ordinary vacuum pressure diffusion bonding to effect sound bonds are extremely critical and difficult to maintain in production. Furthermore, because of the general absence of intermediate material, mating part tolerances, which inherently result in a very narrow joint, are extremely critical. In its current state of development, tolerable part mismatch for ordinary vacuum hot press diffusion bonding is a maximum of about 0.001 inch—an expensive tolerance to achieve and maintain in production.

It is a principal object of this invention to define an improved method for providing between superalloy members a joint of improved strength characteristics and manufacturability.

Another object is to provide an improved bonding powder for use in a bonding method to provide such an improved joint.

A further object is to provide an article including such an improved joint.

These and other objects and advantages will be more fully understood and appreciated from the following detailed description and examples which are intended to be typical of though not limiting on the scope of the present invention.

In the drawings:

FIG. 1 is a graphical comparison between the stress rupture strength of conventionally brazed joints compared with a joint prepared in accordance with the present invention both involving cast members;

FIG. 2 is a graphical comparison of stress rupture strength as in FIG. 1 but involving forged members;

FIG. 3 is an isometric view of a turbomachinery blade including an airfoil portion bonded with base portion;

FIG. 4 is a fragmentary partially sectional isometric view of a gas turbine bladed rotor including an airfoil bonded with a wheel through a root portion;

FIG. 5 is a graphical comparison of double-overlap joints prepared according to the present invention with those prepared by conventional solid state diffusion bonding.

The present invention combines advantages of technology relating to conventional brazing and technology relating to solid state pressure diffusion bonding, eliminating the high-pressure and close tolerance requirements of diffusion bonding. One result is a method which combines the manufacturing ease of brazing with joint strengths generally greater than those of solid state bonding. Yet, as stated, the process differs significantly from solid-state diffusion bonding in that high pressures between members to be joined are eliminated and an unique intermediate powder is used. Only slight aligning pressures, for example slightly above zero p.s.i., are required to effect a sound bond according to the present invention in high vacuum of about $10^{-3}$ mm. Hg or less pressure during initial bonding. In addition, the present method can include subsequent heat treatment to develop maximum bonded joint mechanical properties. Yet close tolerance fits are not mandatory.

The development of the complex, high-strength bonding powder of the present invention makes possible the combination of conventional brazing and solid-state diffusion bonding technology to result in a superalloy joint of improved strength. The present invention in its various aspects will be described in connection with nickel base superalloys because of their significantly greater importance and wider use in the high temperature operating power producing apparatus, such as gas turbine engines, in which the present invention is particularly useful. However, it will be understood by those skilled in the metallurgical arts that the present invention can be applied to other high temperature superalloys such as those based on iron or cobalt.

Typical of the nickel base superalloy members which can be bonded through the practice of the present invention are those shown in the following table I. All of the alloys listed in table I are presently in production or development use in jet engines.

TABLE I

[Nominal wt. percent, bal. Ni and incidental impurities including up to 0.5 each Si and Mn]

| Element | Alloy | | | | | | | |
|---|---|---|---|---|---|---|---|---|
| | A | B | C | D | E | F | G | H |
| C | .18 | .07 | .17 | .09 | .06 | .15 | .05 | .06 |
| Cr | 9.5 | 15 | 14 | 19 | 14 | 14 | 19 | 12 |
| Co | 15 | 15 | 9.5 | 11 | 15 | 8 |  | 12 |
| Mo | 3 | 4.2 | 4 | 10 | 6 | 3.5 | 3 | 7 |
| W |  |  |  | 4 |  | 3 | 3.5 |  | 2 |
| V | 1 |  |  |  |  |  |  |  |
| Al | 5.5 | 4.3 | 3 | 1.7 | 3.8 | 3.5 | .5 | 5 |
| Ti | 4.2 | 3.4 | 5 | 3.2 | 2.5 | 2.5 | 1 | 3 |
| B | .015 | .015 | .015 |  | .015 | .01 |  | .2 |
| Ta |  |  |  |  |  |  | [1]5 |  |
| Cb |  |  |  |  |  | 3.5 | [1]5 | .8 |
| Zr |  |  |  |  |  | .05 |  |  |
| Fe |  |  |  |  |  |  | 18 |  |

[1] Total Cb plus Ta.

The alloys of Table I are typical of alloys within the useful composition range, by weight, of about: 0.02–0.3% C; 8–25% Cr; 5–20% Co; 2–12% Mo; 0.3–7% Al; 0.5–6% Ti; up to 5% W; up to 2% V; up to 6% of elements selected from the group consisting of Cb and Ta; up to 0.2% Zr; up to 0.4% B; up to 25% Fe; with the balance nickel and incidental impurities. As will be shown in detail later, such an alloy range to which has been added greater than 1 percent up to about 15 percent total, based on the entire composition weight, of a melting point depressant selected from the group consisting of B, Si, Mn, Cb, Ta, and their mixtures results in the age hardenable, nickel base bonding powder of the present invention.

The method aspect of the present invention includes the placement of a bonding powder between aligned opposing surfaces to be joined, under either minimal or no imposed pressure. The successful practice of such method and subsequent joint strength and ductility depends upon the characteristics of the bonding powder. Accordingly, the bonding powder aspect of the present invention has the ability to create between the members being joined an improved joint having stress rupture strength several times greater than conventionally brazed joints yet having a melting point below the incipient melting point of the alloys of the members being joined. Basically these characteristics are imparted to the bonding powder of the present invention through the selection of a composition which is matched, through the inclusion of such strengthening elements as Ti, Al, Mo, W, etc., with that of the members to be joined and in which has been included a substantial yet critical amount of a melting point depressant. Thus the bonding powder can perform, in the brazing-type step of the method of the present invention, at a temperature below that which will affect detrimentally the mechanical properties of the superalloy members being joined. In addition, because of the inclusion of such precipitation strengthening elements as Al and Ti along with such solution strengthening elements as Mo or W or both, the resultant joint, unlike other joints, is capable of being aged and hence aged or strengthened concurrently with the alloy of the joined members.

The bonding powder differs in mechanical properties from the base superalloy with which is matched principally in the area of ductility. Inclusion of the melting point depressant causes the bonding powder itself to be brittle. Although this characteristic may assist in the preparation of the present invention as a powder, it prevents use of the alloy of the powder as a structural member. However, when such brittle bonding powder is used to joint such superalloy members, it has been found that the resultant joint has sufficient ductility for its intended purpose.

During evaluation of the present invention, many bonding powders of a variety of compositions were prepared, tested and compared with brazing alloys presently used to joint nickel base superalloy members. Reported in the following tables II, III, IV and V, are the nominal compositions of some of the bonding powders evaluated and data relating to their nominal melting range. As was stated before, the bonding powder of the present invention is matched in composition with superalloy members to be joined. Hence these tables refer to the base alloy composition of table I and merely list the nominal percent by weight of the depressant element or elements included.

The alloys of the bonding powders were prepared by melting under an inert atmosphere (argon) using conventional gas tungsten arc equipment. After preparation of each alloy, it was mechanically crushed to powder.

TABLE II

| | | Silicon as Depressant | | |
|---|---|---|---|---|
| Bonding Powder | Base Alloy* | Si Added (Nom. %) | Nom. Melting Range (°F.) | |
| | | | Solidus | Liquidus |
| 1 | B | 2 | 2125 | 2225** |
| 2 | B | 4.3 | 2100 | 2165 |
| 3 | B | 8 | 2000 | 2075 |
| 4 | C | 4.5 | 2120 | 2170 |
| 5 | C | 5.5 | 2035 | 2125 |
| 6 | C | 6.5 | 2040 | 2100 |
| 7 | C | 7.5 | | 2075 |
| 8 | A | 5 | 2120 | 2170 |

*From table I

**Liquidus near top level

TABLE III

| | | Boron as Depressant | | |
|---|---|---|---|---|
| Bonding Powder | Base Alloy | B Added (Nom. %) | Nom. Melting Range (°F.) | |
| | | | Solidus | Liquidus |
| 9 | C | 1.4 | 2125 | <2225* |
| 10 | C | 1.7 | 2125 | 2200 |
| 11 | C | 3 | <2125 | 2175 |
| 12 | C | 4 | <2075 | 2150 |
| 13 | B | 3 | 2050 | 2175 |

*Liquidus near top level

Although the elements silicon or boron are preferred as a melting point depressant in the powder of the present invention, other depressants and combinations of depressants can be used, as shown by the following table IV.

TABLE IV

| | | Other Depressants and Combinations | | |
|---|---|---|---|---|
| Bonding Powder | Base Alloy | Depressant Added (Nom. %) | Nom. Melting Range (°F.) | |
| | | | Solidus | Liquidus |
| 14 | C | 1.8 Si, 0.4B | 2125 | 2200 |
| 15 | C | 4 Si; 2 B | 2025 | 2100 |
| 16 | C | 2 Si; 2 Mn | >2225 | >2250* |
| 17 | C | 4 Si; 10 Mn | <2100 | 2150 |
| 18 | C | 5 Si; 5 Cb | 2150 | 2175 |
| 19 | C | 15 Cb | 2135 | 2145 |
| 20 | B | 10 Cb | <2175 | 2225* |

*Liquidus too high

**Liquidus near top level

A number of elements are known to reduce the melting point of nickel or nickel alloys. However, as shown by the following table V, appreciable amounts of two such elements, aluminum or titanium or both, are not effective with certain structural alloy members in the practice of the invention. In addition, up to about 5 weight percent Cb alone is not sufficiently effective as a depressant for the relatively lower melting type superalloys.

TABLE V

| | | Ineffective Depressants | | |
|---|---|---|---|---|
| Bonding Powder | Base Alloy | Depressant Added (Nom. %) | Nom. Melting Range (°F.) | |
| | | | Solidus | Liquidus* |
| 21 | C | 4 Al; 4 Ti | 2225 | >2250 |
| 22 | C | 6 Al; 6 Ti | 2225 | >2250 |
| 23 | C | 8 Al; 8 Ti | >2225 | >2250 |
| 24 | A | 8 Ti | 2200 | >2250 |
| 25 | B | 5 Cb | >2225 | >2250 |

*All liquidus temp. too high

One of the characteristics of the bonding powder of the present invention is that it have a liquidus temperature less than the incipient melting temperature of the structural alloys being joined and less than that temperature at which such structural alloys would be detrimentally affected with respect to strength characteristics. The present invention is being described particularly in connection with nickel base superalloys, of which those in table I are typical. Because such nickel base superalloys are heat treated below their incipient melting point and below about 2,250° F., such a temperature point is important in the definition of the present invention as it relates to nickel base superalloys.

Bonding powders such as numbers 1, 9 and 20, identified with the individual depressant silicon, boron, and columbium, are defined by their liquidus temperatures to lie near the top of the range of the present invention. Therefore, when selected alone as a depressant, Si should be at least about 2 percent, B should be greater than about 1 percent and Cb should be at least about 10 percent. However, as shown by the combination of depressants in table IV, lesser amounts of such elements can be used in combination. Therefore, the bonding powder of the present invention has been defined as including the range of depressants in total of from greater than 1 up to about 15 weight percent, provided the liquidus temperature of the powder when used with Ni base superalloys is less than about 2,250° F.

The same level of a depressant in a powder matched to one type of structural member, for example as shown in table I, may be effective and within the scope of the present invention as limited by the liquidus temperature. When that same depressant is used in a powder matched with another superalloy, its liquidus temperature could be too high and outside the scope of the present invention. Thus, the bonding powder of the present invention must be defined not only by its composition but also by its melting characteristics.

As was mentioned before, the elements Si and B, alone or in combination with each other or with other elements are preferred depressants in the practice of the present invention. Specifically preferred are bonding powder forms 4 in table II and forms 9 and 10 in table III, within the preferred bonding powder composition range of, by weight, 0.1–0.2% C; 12–15% Cr; 6–12% Co; 3–5% Mo; 2–4% Al; 4–6% Ti; 3–5% W; 0.01–0.05% Zr; 1.5–10% of elements selected from the group consisting of B, Si, Mn, Cb, Ta, and their mixtures; with the balance nickel and incidental impurities. Within that range, when B is selected it is preferred in the range of 1.5–2.5% and Si when selected is preferred in the range of 4–6%.

The following tables VI, VII, VIII, and IX present comparative strength data for butt joints including comparison with specimens brazed with currently used brazing alloys. These known alloys are identified as number 81, the nominal composition of which, by weight, is 19% Cr, 10% Si with the balance essentially nickel and incidental impurities; and number 50, the nominal composition of which, by weight, is 20.5% Cr, 8.5% Mo, 10% Si, 20.5% Fe, with the balance essentially nickel and incidental impurities.

In the preparation of the specimens the data for which is reported in the following four tables, the bonding powder was prepared in a slurry through the use of a material, for example an acrylic resin in toluene, which decomposes without residue upon heating. The gap between the two members joined was about 0.001 inch and the members were held and aligned with substantially no pressure applied. All of the specimens, including those employing the known brazing alloys as the bonding material, were prepared according to the method of the present invention. Such method involves bonding at a first temperature at or above the liquidus temperature of the bonding powder but below that temperature which would detrimentally affect the properties of the structure members being joined. The bonding is followed by a homogenization heat treatment at a second temperature lower than the first temperature and then, in a preferred form of the method, aging at a third temperature generally lower than the second temperature and always lower than the first temperature. This method of the present invention will be described in more detail later.

TABLE VI

| Example | Joint Stress Rupture Properties Cast Alloy A Members Bonded Test: 1,500° F. at 55,000 p.s.i. | | | |
|---|---|---|---|---|
| | Bonding Powder | Life (hrs.) | R.A.* % | Elongation % |
| 1 | 81 | 20 | 0.6 | 1.0 |
| 2 | 50 | 13 | 0.8 | 0.1 |
| 3 | 4 | 131 | 1.2 | 1.1 |
| 4 | 10 | 539 | 3.0 | 6.7 |
| 5 | 10 | 138 | 0.9 | 1.7 |
| 6 | 9 | 179 | 0.4 | 1.4 |

*Reduction in Area

Specimens reported in table VI were bars three-eighth inch in diameter and 2 inches long with a transverse joint at the bar center. The bonding was conducted in vacuum at 2,225° F. for 30 minutes on all specimens except that bonded with powder No. 9 which was bonded for 5 minutes at that temperature. For brazing alloys 50 and 81, homogenization and aging was conducted at the following temperatures and times: 1,950° F./15 hrs., 2,000° F./16 hrs., 1,550° F./16 hrs. Specimens bonded with powders 4, 9 and 10, within the scope of the present invention, were homogenized and aged at the following temperatures and times: 2,100° F./16 hrs., 1,550° F./16 hrs.

The dramatic increase in stress rupture properties through practice of the present invention is easily seen from the data of table VI. Such stress rupture properties of a bonded joint through practice of the present invention, particularly through use of bonding powder 10, can approach and in some instances coincide with the strength of the structural members being joined. This is shown more clearly in FIG. 1 which presents stress rupture data in the well-known and widely used Larsen-Miller Parameter form as well as at the 50-hour life points at various temperatures. Note how closely the strength of joints bonded with powder 4 and particularly powder 10 approach the strength of the base-cast alloy A. Typical of the significantly lower strength of currently used brazed joints compared with the base alloy is that shown in FIG. 1 for joints in cast alloy A brazed with alloy 81.

Bonded joints in cast alloy C members were prepared according to the method of the present invention in specimens ¼×½×2 inches with a joint at longitudinal across a 0.001-inch gap. Bonding was conducted at 2,225° F. for 5 minutes; homogenization and aging were conducted at 2,100° F./16 hrs., 1,550° F./16 hrs. The data of the following table VII shows joint stress rupture properties of the same order of magnitude improvement as that in table VI.

TABLE VII

| Example | Joint Stress Rupture Properties Cast Alloy C Members Bonded | | |
|---|---|---|---|
| | Bonding Powder | Test: 1,500° F. at 55,000 p.s.i. Life (hrs.) | %Elongation |
| 7 | 4 | 98 | 0 |
| 8 | 9 | 117 | 1.5 |
| 9 | 10 | 238 | 1.3 |

Another series of joint strength tests were conducted on alloy B in the forged condition. The bonded specimens were of the same size and shape as those used to obtain the data of table VI. The bonding method was that of the present invention with bonding conducted at 2,175° F. for 5 minutes. The specimen bonded with powder 10 was homogenized and aged, respectively, at 2,100° F./16 hrs., 1,550° F./16 hrs., and the specimen using alloy 81 was homogenized and aged, respectively, at 1,950° F./16 hrs., 1,550° F./16 hrs. The following table VIII compares both stress rupture and tensile properties. In the tables, "k.s.i." means "1,000 p.s.i."

TABLE VIII.—JOINT STRENGTH PROPERTIES, FORGED ALLOY B

| | | 1,500° F. properties | | | |
|---|---|---|---|---|---|
| | | Stress rupture, at 45 K s.i. life (hrs.) | Tensile | | |
| Ex. | Bonding powder | | Ultimate strength (K s.i.) | 0.2 yield strength (K s.i.) | Elongation, percent |
| 10 | 10 | 476 | 121 | 107 | 9 |
| 11 | 81 | (¹) | 36 | | 0.5 |

¹ Failed on loading.

The fact that joint strength of specimens bonded according to the present invention approaches base alloy strength is shown in FIG. 2, the same type of presentation as is FIG. 1. Again it is to be noted how closely the stress rupture strength of the bonded joint of the present invention approaches that of forged alloy B. The dramatic improvement over joints employing known alloy 81 is clearly shown.

Other series of test were conducted to show the capability of the present invention in bonding two different alloys. Typical of such tests are those the data for which are shown in table IX for cast alloy A bonded with wrought alloy D according to the present invention. The specimen size and shape as well as the homogenization and aging conditions were the same as those for the specimens from which the data of table VII was obtained. Bonding was conducted at 2,225° F. for 5 minutes across a 0.001-inch gap.

across a gap which includes the intermediate lying bonding powder. The bonding powder can be prepared in the form of a slurry or other suitable shape or form to hold or locate it in place in preparation for bonding.

As was mentioned before, and as was the case with the examples described in connection with the above tables, virtually no pressure is required to be applied between members to be joined during practice of the present invention. This feature, which is one distinguishing feature between the present invention and the commonly used solid state diffusion bonding technique, results in joint strength which is dramatically better than those joints obtained through the application of several

TABLE IX.—JOINT STRENGTH PROPERTIES, CAST ALLOY A BONDED WITH WROUGHT ALLOY D

| | | 1,200° F. properties | | | | |
|---|---|---|---|---|---|---|
| | | Stress rupture at 90 K. s.i. | | Tensile | | |
| Example | Bonding powder | Life (hrs.) | Percent elongation | Ultimate strength (K s.i.) | 0.2% yield strength (K s.i.) | Elongation (percent) |
| 12 | 4 | 1,152 | 1.2 | 115 | 96 | 3.0 |
| 13 | 9 | 1,226 | 2.8 | 116 | 96 | 5.0 |

The 1,200 F. property data of table IX again show the unusual strength and ductility of the joint prepared in accordance with the present invention. As was mentioned before, the strength data reported in the above tables resulted from specimens the failure point of which was the bonded joint rather than the parent metal. Therefore, these data represent the strength of the joint.

Typical of additional examples of the application of the present invention to the bonding of members of different alloys and of different conditions are those the data for which are given in the following table X. These data at different temperatures and under different stress conditions again show that the mechanical properties of the bonded joint range from about 80 to 100 percent of the base metal strength.

thousand pounds of pressure under the same conditions of temperature and vacuum but without the presence of the bonding power.

An essential feature of the method of the present invention is that the bonding step be conducted under a high vacuum, such as of no more than about $10^{-3}$ mm. Hg. With the bonding powder of the present invention, the bonding temperature, sometimes referred to here as the first temperature, is in the range of about 1,950°–2,250° F. The bonding temperature is maintained below that temperature which will detrimentally affect the mechanical properties of the structural members being joined and below the incipient melting point of the alloy of the members.

After bonding under high vacuum, the bonded joint is

TABLE X.—JOINT STRENGTH PROPERTIES

| | | | Stress rupture properties | | | | |
|---|---|---|---|---|---|---|---|
| Example | Alloy members | Gap (in.) | Test temp. (° F.) | Stress (K s.i.) | Life (hrs.) | R.A. (percent) | Elongation (percent) |
| 14 | C to C | .001 | 1,500 | 55 | 238 | 1.4 | 1.3 |
| 15 | do | .002 | 1,500 | 55 | 496 | 7.5 | 3.4 |
| 16 | C to D | .004 | 1,200 | 90 | 387 | 6.0 | 4.4 |
| 17 | C to F | .004 | 1,200 | 120 | 349 | 5.0 | 2.8 |

Specimens for which the data of table X were generated were all homogenized at 2,100° F. for 16 hours and aged at 1,550° F. for 16 hours except example 17 which was heat treated as follows: 2,000° F./16 hrs., 1,650° F./4 hrs., 2,000° F./1 hr., 1,350° F./64 hrs. Alloy members C were in the cast condition whereas alloy members D and F were wrought. Bonding powder 10 was used in all cases at a bonding temperature 2,225° F. for 5–15 minutes. In addition, the surface of the specimens were nickel plated to a thickness of about 0.0003 inch in preparation for bonding across the joint gap shown.

As was mentioned before, the method of the present invention combines technology associated with brazing and that related to solid-state diffusion bonding. The combination of such operations under particular and critical conditions eliminates the need for pressure other than that sufficient to maintain in alignment and in juxtaposition the appropriate surfaces of the members to be joined. In conventional solid-state diffusion bonding, substantial pressures, for example at least about 100 p.s.i., are required. Practice of the bonding portion of the method of the present invention can be conducted at pressures well below such pressures and generally those approaching zero p.s.i.

In the practice of the method of the present invention, as generally described before, the member surfaces to be joined are placed in juxtaposition and alignment one with the other homogenized under nonoxidizing and preferably vacuum conditions for a time sufficient to further bond the joint by interdiffusion between the members and the bonding powder. Such homogenization is conducted at a temperature, sometimes referred to here as the second temperature which is less than the first temperature under which bonding was carried out. As used with bonding powders and alloys described in the above table, that temperature is in the range of about 1,600°–2,100° F.

Although the joint thus prepared is strong and ductile, it can be further strengthened, according to one form of the present invention, because of its composition. Such strengthening is accomplished through aging at a third temperature less than the first temperature and usually, except with some special alloys, less than the second temperature. As described in connection with the above examples, the aging or third temperature is in the range of about 1,300°–2,000° F.

The present invention can be practiced using joint gaps up to about 0.02 inch. However, it is preferred that the gap be maintained in the range of about 0.001–0.005 inch. As shown by the above data, joint strength across such gaps can closely approximate that of the base metal in the members joined.

Photomicrographic and chemical analyses studies of the improved joint resulting from practice of the present invention has shown the affected zone on either side of the original gap to be up to about 0.005 inch and generally no more than about 0.002 inch on either side. Thus, the total joint portion in an article prepared in accordance with the present invention, including the original gap, would be up to about 0.03 inch and preferably only up to about 0.01 inch. Within that joint portion there has been found to exist a phase, distinguishable from those of the joined members and rich in those elements added as a melting temperature depressant. For example, the presence of concentrations of boron is shown by the typical "Chinese script" phase and the presence of silicon is shown by blocky silicides. Concentrations are heavier in the central area of the joint portion, decreasing as diffusion has occurred.

Not only does the practice of the present invention result in joints of significantly improved strength properties over those achievable either through conventional brazing or through ordinary solid state diffusion bonding, but also it allows the joining of members which are very difficult to joint adequately by other processes. For example, it is very difficult to bond successfully by ordinary solid state diffusion bonding techniques or by fusion welding two members of alloy C of table I. Nevertheless, as is shown by the data of table X, the present invention provides butt joint strength properties approaching that of the alloy of the members themselves. Such improved strength characteristics result, at least in part, from elimination of the inherent notch at the edge of the solid state diffusion bonded joints. Maintenance of the joint gap to about 0.005 inch or less assists in achieving high strength.

Additional studies with overlap joints, particularly in joined members having a plurality of overlap joint portions, exhibited significantly improved strength properties through the practice of the present invention. Examples of such overlap joints, in these cases double-overlap joints, are shown in FIGS. 3 and 4.

FIG. 3 shows a turbomachinery blade, typical of one used in a gas turbine engine, and having an airfoil portion 10 and a base portion 12. The airfoil and base portions are bonded together at overlapping joint portions 14 which together are referred to here as a double-overlap joint. Such a joined article, for example, if desired either for weight reduction or to provide a fluid passage, can include a hollow portion 16 between airfoil 10 and base 12. Such a fluid passage as 16 can communicate with one or more airfoil coolant channels or chambers 18. If desired for added strength, however, passage 16 can be eliminated and an additional joint, in this case a butt joint, can be provided between airfoil 10 and base 12 in addition to the overlap-type joints 14. If desired, for example so that the airfoils have different characteristics at one edge compared with the other, the airfoil can be made from a plurality of members bonded at a longitudinal or radial joint.

A combination between a double-overlap joint and a butt joint is shown in FIG. 4 which diagrammatically represents a bladed rotor of the type typically used in a gas turbine engine. The blade shown generally at 20 includes an airfoil portion 22 and a root portion 24. Root portion 24 is bonded with wheel 26 through its rim 27 at double-overlap joint 28 and butt joint 30.

Although the articles of FIGS. 3 and 4, representative of turbomachinery blades, vanes, and wheels in general, have been described specifically as comprising two members bonded together, it will be understood that such articles, individually or in combination, can be made by bonding various combinations of portions. For example, the airfoil can be bonded to the root portion and the root portion either to the wheel rim or to a base. It may be desirable to have the airfoil of a cast material, the root of one type of wrought material and the wheel or base of a second type of wrought material. In addition, it may be desirable to bond two blade airfoils along a radial base joint to provide a common base. Further, it may be desirable to make a hollow wheel by bonding two wheel halves.

As was stated before, practice of the present invention eliminates the inherent notch at the edge of conventional solid-state pressure diffusion-bonded joints. Such a notch can result in inferior low-cycle fatigue characteristics in overlap shear joints, for example, of the double type shown in FIGS. 3 and 4. One series of evaluations, which compared double-overlap joints prepared according to the present invention with conventional solid-state pressure diffusion-bonded joints, included the bonding of two members in the type of configuration of FIG. 3. The member corresponding with airfoil 10 was cast alloy A and the member corresponding with base 12 was wrought alloy B. The bonding powder used with those specimens prepared according to the present invention was bonding powder 10 of table III, bonded at a temperature of 2,210° F. for 15 minutes. The method of the present invention was further conducted through the homogenization and aging steps as follows: 2,000° F./16 hrs.; 1,925° F./4 hrs.; 1,550° F./16 hrs. As shown by the data of FIG. 5, the 1,200° F. low-cycle fatigue strength of the joints bonded according to the present invention were superior to similar joints made by ordinary solid-state pressure diffusion bonding treated substantially the same as the joints prepared according to the present invention except that the bonding powder of the present invention was not used, a nonmolten interlayer was used; and a pressure of about 2,000 p.s.i. was applied for about 2 hours.

Thus the bonding powder of the present invention makes possible the practice of the method of the present invention to result in an article having an improved joint significantly stronger than one produced by known methods.

What is claimed is:

1. In a method for bonding a plurality of age hardenable superalloy members, the superalloy based on an element selected from the group consisting of Fe, Co, and Ni, the steps of:

placing between aligned, juxtapositioned surfaces of the members to be joined, to define a joint portion having a gap in the range of up to about 0.02 inch, an age hardenable bonding material having a composition which is matched with the composition of the members, which includes greater than 1 up to about 15 weight percent of the total composition of the elements selected from the group consisting of B, Si, Mn, Cb, Ta, and their mixtures, and which, as a result, has a liquidus temperature less than the incipient melting temperature of the members;

providing around the joint portion a high vacuum;

heating the joint portion in such vacuum at a first temperature and for a time sufficient to at least partially melt the bonding material but below the incipient melting temperature of the superalloy members; and then homogenizing the joint portion by heating under nonoxidizing conditions at a second temperature lower than the first temperature to produce interdiffusion between the members and the bonding material.

2. In a method as described in claim 1 in which, after homogenization, the joint portion is heated at a third temperature less than the first temperature for a time sufficient to age-harden the joint portion.

3. In a method as described in claim 1 for bonding a plurality of age hardenable superalloy members, the superalloy based on an element selected from the group consisting of Fe, Co, and Ni, in which:

the age-hardenable bonding material consists essentially of, by weight, up to about 0.3% C, up to about 25% Cr, up to about 17% of elements selected from the group consisting of Mo and W, 0.3–7% Al, 0.5–6% Ti, up to about 2% V, up to about 0.2% Zr, greater than 1 up to about 15 weight percent of the total composition of elements selected from the group consisting of B, Si, Mn, Cb, Ta, and their mixtures, with the balance except for incidental impurities selected from the group consisting of Fe, Co, and Ni.

4. In a method as described in claim 3 for bonding superalloy members based on nickel in which:

the high vacuum is no more than about $10^{-3}$ mm. Hg pressure;

the joint gap is in the range of 0.001–0.005 inch;

the bonding material consists essentially of an age hardenable powder consisting essentially of, by weight, 0.02–0.3% C; 8–25% Cr; 5–20% Co; 2–12% Mo; 0.3–7% Al; 0.5–6% Ti; up to about 5% W up to about 2% V; up to about 0.2% Zr; up to about 25% Fe; with the balance nickel and incidental impurities and greater than 1 percent up to about 15 percent of elements selected from the groups consisting of B, Si, Mn, Cb, Ta, and their mixtures; the powder having a liquidus temperature below about 2,250° F.;

the first temperature is in the range of about 1,950°–2,250° F.; and the second temperature is in the range of about 1,600°–2,100° F.

5. In a method as described in claim 4 in which, after homogenization, the joint portion is heated at a third temperature less than the first temperature and in the range of about 1,300°–2,000° F. for a time sufficient to age the joint portion.

\* \* \* \* \*